United States Patent Office 3,259,564
Patented July 5, 1966

3,259,564
HYDROCRACKING CONVERSION CATALYST COMPRISING A HYDROGENATION COMPONENT DEPOSITED ON A CRYSTALLINE SYNTHETIC MORDENITE ZEOLITE AND ITS USE IN HYDROCRACKING
Charles Newton Kimberlin, Jr., Baton Rouge, La., assignor to Esso Research and Engineering Company, a corporation of Delaware
No Drawing. Filed Aug. 14, 1962, Ser. No. 216,726
21 Claims. (Cl. 208—111)

The present invention deals with improved means of obtaining high octane gasolines by hydrocracking hydrocarbons with certain synthetic crystalline alumino-silicate zeolites. More particularly, it deals with a catalyst, characterized by a hydrogenation component, e.g. platinum group metal, deposited on, or composited with, a base exchanged crystalline mordenite which has the ability to adsorb cyclic and aromatic hydrocarbons.

It is well known in the art that various hydrocarbon oil fractions can be upgraded by subjecting them to hydrocracking conditions in the presence of either a fixed or fluid bed, etc., of a catalytic material. Feed hydrocarbons undergo both cracking and hydrogenation to give gasoline products possessing superior engine cleanliness characteristics. It has recently been suggested to employ as a hydrocracking catalyst a platinum group metal deposited on or composited with a crystalline alumino-silicate zeolite having a silica to alumina ratio of greater than 2.5, preferably of about 3 to 6. Whereas such materials do exhibit hydrocracking activity, it has now been found that a specific form of mordenite exhibits unusual activity with respect to isobutane to normal butane ratio in the product, lower gas production and higher gasoline yield. The mordenite type zeolite employed in the practice of the present invention is distinguished from known naturally occurring mordenite samples in that the mordenite employed in the present invention exhibits ability to adsorb cyclics, aromatics, naphthenes and isoparaffins and may be characterized as a mordenite type zeolite having the ability to adsorb at least 1.5 wt. percent of benzene in the sodium form or 5.0 wt. percent of benzene in the hydrogen form at a temperature of 205° F. and a pressure of 0.5 atmosphere. These mordenite zeolites employed in the practice of the present invention are chemically represented by the following formula

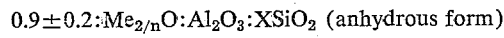
0.9±0.2:Me$_{2/n}$O:Al$_2$O$_3$:XSiO$_2$ (anhydrous form)

wherein Me is selected from the group consisting of metal cations and hydrogen-containing cations, $n$ is its valence, and X is a number from about 9 to 11, and usually about 10. While this molar formula also represents naturally occurring mordenite, the natural occurring variety thereof normally fails to show adsorptive affinity for cyclics and aromatics as indicated previously. Mordenite type zeolites employed in the practice of the present invention are commercially available from the Norton Company of Worcester, Massachusetts, and have been described in the literature, e.g. C & E News, March 12, 1962. They are believed to have an effective pore diameter of about 6 to 10 A.

The hydrocracking catalyst of the present invention comprises a hydrogenation component deposited on or composited with the aforementioned mordenite type crystalline alumino-silicate zeolite. Particularly preferred are mordenite zeolites containing platinum group metal and characterized by their having been treated to reduce their Na$_2$O content to less than 5 wt. percent, preferably less than 2.0 wt. percent. Other hydrogenation components may be iron, cobalt, nickel, MoO$_3$ or CoMoO$_4$, although platinum, palladium or rhodium of the platinum group metals is preferred. In general, 0.05 to 5.0, preferably 0.1 to 2.0, wt. percent of hydrogenation component is employed in the ultimate catalyst.

The mordenite zeolite is normally produced or found in its sodium form and must be treated to reduce its sodium content to less than 5 wt. percent in order to serve as an effective hydrocracking catalyst. This may be done by cation exchange with various salts of metals which have no detrimental effect on the hydrocracking reaction, e.g. cobalt, nickel, zinc, cadmium, copper or alkaline earth, or alternatively, and preferably, by exchange with a hydrogen-containing cation, e.g. acid hydrogen or an ammonium ion containing the material. When employing the latter, the resulting ammonium derivative is then dried and calcined to decompose the ammonium ion to give what has been termed the hydrogen form of the zeolite. In either case, the exchanged alumino-silicate zeolite is then treated with a hydrogenation component, e.g. platinum group metal such as platinum, palladium, etc., in order that the crystalline zeolite have a substantial proportion of hydrogenation component supported thereon.

The base exchange step with various metal cations or hydrogen containing cations is normally conducted at temperatures of 50° to 150° F. by conventional base exchange with a suitable salt of the cation which is desired to be introduced into the mordenite zeolite to replace sodium. The step in which the base exchanged form of the mordenite zeolite is composited with the hydrogenation component, i.e. noble metal, may be in the nature of a wet impregnation or base exchange reaction. Thus, a palladium or platinum salt or an ammonium complex of these elements, e.g. Pd(NH$_3$)$_2$Cl$_2$, ammonium chloroplatinate, and many others may be used. The palladium salt such as palladium chloride may also be used. After contacting the mordenite zeolite with the solution of hydrogenation component, the resulting composition is treated to reduce the hydrogenation component at least in part to a metallic state. This is normally done by heating in the presence of hydrogen gas to a temperature of 600° to 1000° F., preferably 700° to 900° F.

The conditions for the hydrocracking reaction conducted in accordance with the present invention are generally those well known in the art. It involves cracking of distillates boiling from 300° F. upwards in the presence of hydrogen and the hydrocracking catalyst of the present invention, i.e. hydrogenation component deposited on an exchanged form of a mordenite zeolite having the ability to adsorb at least 1.5, preferably 5, wt. percent of benzene at 205° F. Reaction temperatures are generally from 500° to 800° F., pressures 300 to 5,000 p.s.i.a. with about 2000 to 20,000 s.c.f of hydrogen being passed to the reaction zone per barrel of feed. Preferred feed fractions boil in the range of 400° to 900° F. and include virgin and coker gas oils, cycle oils, heating oils and similar materials derived from catalytic cracking. Feed throughputs generally range from about 0.5 to 5 v./v./hr. In view of the highly exothermic nature of the hydrocracking reaction, it may be desirable to cool portions of the reaction bed and/or feed streams thereto, e.g. recycle gas stream in order to maintain suitable reaction temperature. All this may be done in a manner known per se in the art.

The uniqueness of the present catalyst composition, as well as hydrocracking process, is evidenced by the fact that the use of a crystalline alumino-silicate zeolite having precisely the same silica to alumina ratio as the catalyst of the present invention, but not having its adsorptive properties, fails to exhibit hydrocracking ability. Similarly, the present compositions show better hydrocracking ability with respect to lower gas make, higher gasoline production with a higher ratio of isobutane to normal butane (higher octane) than does the use of the crystalline alumino-silicate catalyst having a silica to alumina mole ratio of about 3 to 6 as well as an effective pore diameter of about 6 to 15 A. The present catalyst is particularly effective in treating feed stocks containing less than 100 parts per million of nitrogen. Thus, it may readily be utilized in a combination process wherein a feed stock is hydrofined to first reduce its nitrogen content prior to hydrocracking with the catalyst of the present invention.

The various aspects and modifications of the present invention will be made more clearly apparent by reference to the following description and accompanying examples.

*Example 1*

The following example illustrates the preparation of a catalyst composition in accordance with the present invention.

A hydrogen form mordenite type zeolite, obtained from the Norton Company of Worcester, Massachusetts, and believed to have been produced from a synthetic sodium form mordenite by treatment with dilute acid to replace the sodium ions with hydrogen ions was employed. It had a silica to alumina mole ratio of about 10 and a soda content of about 0.9 wt. percent $Na_2O$ and was capable of adsorbing 6.2 wt. percent benzene, 5.0 wt. percent cyclohexane, or 4.6 wt. percent n-hexane at 205° F. and 0.5 atmosphere pressure. It was converted to the present catalyst in the following manner:

Two hundred grams of the hydrogen form mordenite were suspended in 500 cc. of water and while stirring a 28% solution of ammonia was added slowly until the pH of the slurry was raised to 8.0. There was then added, with stirring, a solution prepared by dissolving 1.67 grams of palladous chloride and 3 cc. of 28% ammonia solution in 100 cc. of water. Stirring was continued for 30 minutes after the addition of the palladium solution. The mixture was then filtered and the catalyst was dried at 220° F. and was then calcined at 950° F. for 10 hours to replace the ammonium ions by hydrogen ions.

The resulting catalyst composition, i.e. palladium deposited on the hydrogen form of mordenite had the following composition: 0.5 wt. percent palladium (based on total composition), 0.9 wt. percent $Na_2O$, and a silica to alumina ratio of about 10.

This catalyst composition is hereinafter denoted as "zeolite A."

*Example 2*

Zeolite A was then employed as a hydrocracking catalyst for converting hydrocarbon oils to lighter products of improved octane number. It was compared with a similar composition of palladium deposited on a large pore crystalline alumino-silicate zeolite having a silica to alumina ratio of about 5.0 (denoted as "zeolite B"). In both cases, the zeolite contained 0.5 wt. percent palladium based on total composition, the control test with the zeolite B similarly involving a zeolite which had been converted to the hydrogen form thereof. The soda content was reduced to essentially the same level as zeolite A.

In all examples the catalyst had initially been reduced at 900° F. with a low rate of hydrogen for approximately about 14 hours. The feed was a hydrofined, raw, light catalytic cycle oil having a boiling range of about 450° to 650° F. and which contained about 2 parts per million of nitrogen. Conversions were conducted at 1000 p.s.i. and 10,000 cubic feet of hydrogen per barrel of feed with a feed flow rate of 1 v./v./hr. Results are shown in Table I.

TABLE I.—HYDROCRACKING HYDROFINED CYCLE OIL

| Catalyst | 0.5% Pd on Zeolite B | 0.5% Pd on Zeolite A (present invention) |
|---|---|---|
| Temperature, °F | 750 | 650 | 760–770 |
| Yields, Wt. Percent: | | | |
| $C_3$ and Lighter | 19.5 | 13.0 | 8.6 |
| $C_4$ | 27.5 | 23.0 | 7.2 |
| $C_5$–430° F | 38.0 | 49.5 | 65.8 |
| 430° F.+ | 18.5 | 19.0 | 18.4 |

As shown by the above results, the mordenite catalyst of the present invention shows substantially less gas make as well as higher gasoline production than does a similar hydrocracking catalyst employing a large pore, relatively high silica to alumina zeolite. Moreover, data illustrate the higher octane product obtainable in accordance with the use of the present catalyst as shown by the higher iso-$C_4$ to n-$C_4$ ratio obtained. These results are particularly surprising because heretofore the zeolite denoted as zeolite B was considered to be a particularly effective cracking catalyst component. Whereas naturally occurring mordenite samples having the same silica to alumina ratio as that employed in the present compositions showed little or no catalytic activity, the present composition shows unusually good hydrocracking ability.

*Example 3*

Zeolite A illustrating the composition of the present invention was compared with zeolite B of Example 2 with respect to their ability to process straight light catalytic cycle oils having a boiling range of 450° to 650° F. and a nitrogen content of 50 p.p.m. Conversion pressures of 1000 p.s.i. as well as feed rates of 1.0 v./v./hr. and use of 10,000 s.c.f. of hydrogen per barrel of feed were employed in the following runs shown in Table II.

TABLE II.—HYDROCRACKING RAW LIGHT CATALYTIC CYCLE OIL

| Catalyst | 0.5% Pd on Non-Mordenite Zeolite (Zeolite B) | 0.5% Pd on H-Mordenite (Zeolite A) |
|---|---|---|
| Temperature, °F | 710 | 755–765 |
| Yields, Wt. Percent: | | |
| $C_4$ and Lighter | 10.0 | 7.6 |
| $C_5$–430° F | 32.5 | 39.2 |
| 430° F.+ | 53.0 | 53.2 |
| i-$C_4$/n-$C_4$ | 1.4 | 5.2 |

As shown in Table II, the catalyst of the present invention gives substantially less gas make, i.e. $C_4$ and lighter materials, than a closely related zeolitic catalyst. Moreover, it shows a substantial improvement in the ratio of i-$C_4$ to n-$C_4$ thus resulting in a higher octane product.

Various modifications may be made to the present invention. For example, the present hydrocracking process may utilize many of the techniques normally found in conventional hydrocracking processes.

Having described the present invention, that which is sought to be protected is set forth in the following claims.

What is claimed is:

1. An improved hydrocracking catalyst which comprises a hydrogenation component deposited on a crystalline synthetic mordenite zeolite having a silica to alumina ratio in the range of about 9 to 11 and having the ability to adsorb at least 1.5 wt. percent of benzene at 205° F. and 0.5 atmosphere in its unexchanged form, said mordenite zeolite having been exchanged with a cation to reduce its $Na_2O$ content to less than 5 wt. percent.

2. The composition of claim 1 wherein said hydrogenation component is a platinum group metal.

3. An improved catalyst composition which comprises 0.05 to 5 wt. percent of a platinum group metal deposited on a crystalline synthetic mordenite zeolite having a silica to alumina ratio of about 9 to 11 having the ability to adsorb at least 1.5 wt. percent benzene at 205° F. and 0.5 atmosphere in its unexchanged form, said mordenite zeolite having been subjected to cation exchange so as to reduce its $Na_2O$ content to less than 5 wt. percent.

4. An improved catalyst composition which comprises 0.05 to 5 wt. percent of a platinum group metal deposited on a crystalline synthetic mordenite zeolite having a silica to alumina ratio of about 9 to 11 having the ability to adsorb at least 1.5 wt. percent benzene at 205° F. at 0.5 atmosphere in its unexchanged form, said mordenite zeolite having been subjected to cation exchange so as to reduce its $Na_2O$ content to less than 5 wt. percent by virtue of having been base exchanged with a hydrogen-containing cation.

5. The composition of claim 4 wherein said zeolite has been base exchanged with a hydrogen-containing cation and contains 0.05 to 5 wt. percent of palladium.

6. An improved process for hydrocracking hydrocarbon streams to obtain improved product quality which comprises subjecting said hydrocarbons to hydrocracking conditions in the presence of added hydrogen and a crystalline synthetic mordenite catalyst, said catalyst comprising a hydrogenation component composited with a mordenite zeolite having a silica to alumina mol ratio of about 9 to 11 and having the ability to adsorb at least 1.5 wt. percent of benzene at 205° F. at 0.5 atmosphere in its unexchanged form, said zeolite being further characterized in that it contains less than 5 wt. percent $Na_2O$.

7. The improved process of claim 6 wherein said hydrogenation component is a platinum group metal.

8. An improved process for hydrocracking hydrocarbon streams to obtain improved product distribution which comprises subjecting said hydrocarbons to hydrocracking conditions in the presence of added hydrogen and a crystalline synthetic mordenite catalyst, said catalyst comprising 0.05 to 5 wt. percent of a platinum group metal deposited on a crystalline synthetic mordenite zeolite having a silica to alumina mol ratio of 9 to 11 and which has the ability to adsorb at least 1.5 wt. percent of benzene at 205° F. at 0.5 atmosphere in its unexchanged form, said zeolite being further characterized in that it contains less than 5 wt. percent sodium calculated as $Na_2O$.

9. The improved process of claim 8 wherein said mordenite zeolite has been subjected to base exchange with a hydrogen-containing cation to reduce its $Na_2O$ content.

10. Improved process of claim 8 wherein said mordenite catalyst contains 0.05 to 5 wt. percent of palladium.

11. The improved process of claim 8 wherein said mordenite catalyst has been base exchanged with a hydrogen-containing cation to reduce its $Na_2O$ content and contains 0.05 to 5 wt. percent palladium deposited thereon.

12. An improved hydrocracking process which comprises hydrocracking a hydrocarbon oil boiling above 300° F. in the presence of 2,000 to 20,000 s.c.f. of hydrogen per barrel of feed at temperatures of 500° to 800° F. and pressures of 300 to 5,000 p.s.i. in the presence of a hydrocracking catalyst comprising 0.05 to 5 wt. percent palladium deposited on a crystalline synthetic mordenite zeolite having a silica to alumina mol ratio of 9 to 11 and the ability to adsorb at least 1.5 wt. percent of benzene at 205° F. and 0.5 atmosphere in its unexchanged form, and which has been base exchanged with a hydrogen-containing cation so as to reduce its $Na_2O$ content to less than 5 wt. percent.

13. The composition of claim 2, wherein said hydrogenation component is selected from the group consisting of palladium and platinum.

14. The composition of claim 1, wherein said catalyst contains about 0.05 to 5 wt. percent of a metal selected from the group consisting of cobalt, nickel or iron.

15. The composition of claim 1, wherein said mordenite zeolite has been exchanged with a cation selected from the group consisting of hydrogen-containing cation, a zinc cation or a cadmium cation so as to reduce its $Na_2O$ content to less than 5 wt. percent.

16. An improved catalyst composition which comprises about 0.05 to 5 wt. percent of a hydrogenation component composited with a crystalline synthetic mordenite zeolite having the abiilty to adsorb at least 1.5 wt. percent benzene at 205° F. and at 0.5 atmosphere in its unexchanged form, said mordenite zeolite having been base exchanged with a cation to thereby reduce its $Na_2O$ content to less than 5 wt. percent.

17. The composition of claim 16, wherein said hydrogenation component is selected from the group consisting of cobalt, iron, nickel, platinum, palladium or molybdenum.

18. An improved process for hydrocracking hydrocarbon streams to obtain products boiling lower than said hydrocarbon stream which comprises subjecting said hydrocarbon stream to hydrocracking conditions in the presence of added hydrogen and a catalyst comprising between about 0.05 to 5 wt. percent of a hydrogenation component composited with a crystalline synthetic mordenite zeolite having the ability to adsorb at least 1.5 wt. percent of benzene at 205° F. and 0.5 atmosphere in its unexchanged form, said crystalline synthetic mordenite zeolite being further characterized in that it contains less than 5 wt. percent $Na_2O$ by virtue of having been exchanged with a cation.

19. The process of claim 18, wherein said hydrogenation component is selected from the group consisting of iron, cobalt or nickel.

20. The process of claim 18, wherein said cation is selected from the group consisting of a cobalt, nickel, zinc or hydrogen-containing cation.

21. An improved hydrocracking process which comprises subjecting a petroleum fraction boiling in the range of 400 to 900° F. to hydrocracking at a temperature in the range of 500 to 800° F., a pressure of 300 to 5000 p.s.i., a hydrogen feed rate of 2000 to 20,000 s.c.f./b. hydrocarbon feed, in the presence of a hydrocracking catalyst comprising between about 0.1 to 2.0 wt. percent of a platinum group metal composited with a crystalline synthetic mordenite zeolite having a silica to alumina mol ratio of 9 to 11 and which has been exchanged with a hydrogen-containing cation so as to have a $Na_2O$ content of less than 5 wt. percent, said zeolite being further characterized by the abiilty to adsorb at least 1.5 wt. percent of benzene at 205° F. and 0.5 atmosphere in its unexchanged form.

References Cited by the Examiner

UNITED STATES PATENTS

| | | | |
|---|---|---|---|
| 2,971,904 | 2/1961 | Gladrow et al. | 208—120 |
| 2,983,670 | 5/1961 | Seubold | 208—110 |
| 3,039,953 | 6/1962 | Eng | 208—26 |
| 3,130,006 | 4/1964 | Rabo et al. | 23—110 |
| 3,132,087 | 5/1964 | Kelly et al. | 208—110 |
| 3,140,251 | 7/1964 | Plank et al. | 208—120 |

OTHER REFERENCES

Synthesis and Reactions of Mordenite, by R. M. Barrer, Journal of the Chemical Society, 1948, pages 2158–2163.

DELBERT E. GANTZ, *Primary Examiner.*

ALPHONSO D. SULLIVAN, *Examiner.*

A. RIMENS, *Assistant Examiner.*